US011287703B2

(12) United States Patent
Jia et al.

(10) Patent No.: US 11,287,703 B2
(45) Date of Patent: Mar. 29, 2022

(54) DUAL-CELL DISPLAY DEVICE (71) Applicant: Hisense Visual Technology Co., Ltd., Shandong (CN)

(72) Inventors: Wenpeng Jia, Shandong (CN); Jianguo Han, Shandong (CN); Zhiqiang Tang, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 126 days.

(21) Appl. No.: 16/825,033

(22) Filed: Mar. 20, 2020

(65) Prior Publication Data

US 2020/0393712 A1 Dec. 17, 2020

Related U.S. Application Data (63) Continuation of application No. PCT/CN2020/075768, filed on Feb. 18, 2020.

(30) Foreign Application Priority Data

Jun. 12, 2019 (CN) .......................... 201910507197.0

(51) Int. Cl.
*G02F 1/1347* (2006.01)
*G02F 1/1333* (2006.01)
*G02F 1/1345* (2006.01)

(52) U.S. Cl.
CPC ........ *G02F 1/13452* (2013.01); *G02F 1/1347* (2013.01); *G02F 1/133305* (2013.01); *G02F 1/133308* (2013.01); *G02F 1/133328* (2021.01)

(58) Field of Classification Search
None
See application file for complete search history.

(56) References Cited

U.S. PATENT DOCUMENTS

2003/0030366 A1   2/2003  Ha
2006/0232495 A1  10/2006  Chang et al.
(Continued)

FOREIGN PATENT DOCUMENTS

CN   1405834 A    3/2003
CN   1855178 A   11/2006
(Continued)

OTHER PUBLICATIONS

ISA State Intellectual Property Office of the People's Republic of China, International Search Report Issued in Application No. PCT/CN2020/075768, dated May 19, 2020, WIPO, 5 pages.

*Primary Examiner* — Phu Vu
(74) *Attorney, Agent, or Firm* — Crowell & Moring LLP (57) ABSTRACT The present application discloses a dual-cell display device. The dual-cell display device includes: a first backplane, a first panel, and a second panel arranged in order along a thickness direction of the dual-cell display device, where the first panel includes at least one first flexible circuit board on a side of the first panel; and the second panel includes at least one second flexible circuit board on a counterpart side of the second panel corresponding to the side of the first panel where the at least one first flexible circuit board is disposed. The dual-cell display device further includes: a first drive board and a second drive board which are arranged in parallel on the first backplane; and a distance between the first drive board and the first backplane is different from a distance between the second drive board and the first backplane.

13 Claims, 9 Drawing Sheets (56) References Cited

U.S. PATENT DOCUMENTS

| | | |
|---|---|---|
| 2007/0115419 A1 | 5/2007 | Song |
| 2007/0126654 A1 | 6/2007 | Choi et al. |
| 2014/0049734 A1 | 2/2014 | Erinjippurath et al. |
| 2017/0367214 A1* | 12/2017 | Stellman .............. G02B 6/0085 |
| 2018/0356696 A1 | 12/2018 | Lee et al. |
| 2019/0353950 A1* | 11/2019 | Jin ........................... H05K 5/03 |
| 2020/0004078 A1* | 1/2020 | Yabuki .................. G02F 1/1345 |

FOREIGN PATENT DOCUMENTS

| | | |
|---|---|---|
| CN | 101013208 A | 8/2007 |
| CN | 103091896 A | 5/2013 |
| CN | 103518157 A | 1/2014 |
| CN | 109031800 A | 12/2018 |
| CN | 109828417 A | 5/2019 |

\* cited by examiner

DUAL-CELL DISPLAY DEVICE

CROSS REFERENCE TO RELATED APPLICATIONS

This application is a continuation application of International Application No. PCT/CN2020/075768 filed on Feb. 18, 2020, which claims priority to Chinese Patent Application No. 201910507197.0 filed on Jun. 12, 2019, the entire content of which is incorporated herein by reference.

TECHNICAL FIELD

The present application relates to display technology, and in particular to a dual-cell display device.

BACKGROUND

In recent years, with continuous development of display technology, consumers have increasingly demanded high image quality, where image contrast is an important consideration factor. As a result, dual-cell display technology is proposed in the industry, in which two liquid crystal panels are stacked together, so that a brightness of a dark frame (i.e., a black picture or a dark picture displayed on a dual-cell display device) is reduced through cooperation of an upper and lower panels of the two liquid crystal panels. However, a structural form of a dual-cell display device has not been proposed. There is thus an urgent need to design a structural assembly as a display device for the dual-cell display technology.

SUMMARY

The present application provides a dual-cell display device.

The dual-cell display device according to the present application includes a first backplane, a first panel, and a second panel arranged in order along a thickness direction of the dual-cell display device, the first panel includes at least one first flexible circuit board on a side on the first panel, and the second panel includes at least one second flexible circuit boards on a counterpart side of the second panel corresponding to the side of the first panel where the at least one first flexible circuit board is disposed.

The dual-cell display device further includes a first drive board connected with the at least one first flexible circuit board; and a second drive board connected with the at least one second flexible circuit board. The first drive board and the second drive board are arranged in parallel on the first backplane. A distance between the first drive board and the first backplane is different from a distance between the second drive board and the first backplane.

BRIEF DESCRIPTION OF THE DRAWINGS

In order to explain the embodiments of the present application more clearly, the drawings used in the illustration of the embodiments are briefly described below. The drawings in the following description are only exemplary embodiments of the present application. Those having ordinary skill in the art may also derive other drawings based on these drawings without involving inventive work.

DETAILED DESCRIPTION OF THE EXAMPLES

Exemplary embodiments are provided so that this disclosure fully conveys the scope to those having ordinary skill in the art. Numerous specific details are set forth as examples of specific components, devices, and methods, to provide a thorough understanding of embodiments of the present disclosure. It will be apparent to those having ordinary skill in the art that specific details need not be employed, that exemplary embodiments may be embodied in many different forms and that neither should be construed to limit the scope of the disclosure. In some exemplar embodiments, well-known processes, well-known device structures, and well-known technologies are not described in detail.

The term used herein is for the purpose of describing particular exemplar embodiments only and is not intended to be limiting. As used herein, the singular forms "a," "an," and "the" may be intended to include the plural forms as well, unless the context clearly indicates otherwise. The terms "comprise," "contain," "include," and "have" are inclusive and therefore specify the presence of stated features, integers, steps, operations, elements, and/or components, but do not preclude the presence or addition of one or more other features, integers, steps, operations, elements, components, and/or combination thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or portions, these elements, components, regions, layers and/or portions should not be limited by these terms. These terms may be only used to distinguish one element, component, region, layer or portion from another region, layer or portion. Terms such as "first," "second," and other numerical terms when used herein do not imply a sequence or order unless clearly indicated by the context. Thus, a first element, component, region, layer or portion discussed below could be termed a second element, component, region, layer or portion without departing from the teachings of the example embodiments.

Spatial relationship terms, such as "inner," "outer," "beneath." "below or under," "lower or bottom," "above," "upper," and the like, may be used herein for ease of description of a relationship between one element or feature and another element(s) or feature(s) as illustrated in the figures. Spatial relationship terms also relate to different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatial relationship description used herein interpreted accordingly.

Exemplary embodiments are now described more fully with reference to the accompanying drawings.

Figure 1A:
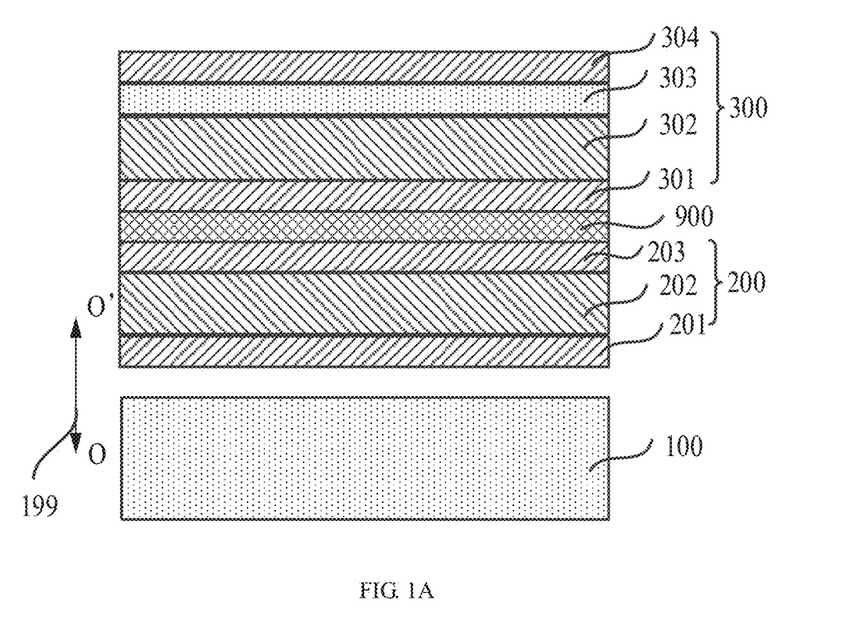
FIG. 1A is an exploded schematic view illustrating a dual-cell display device according to an example of the present application.
Figure 1B:
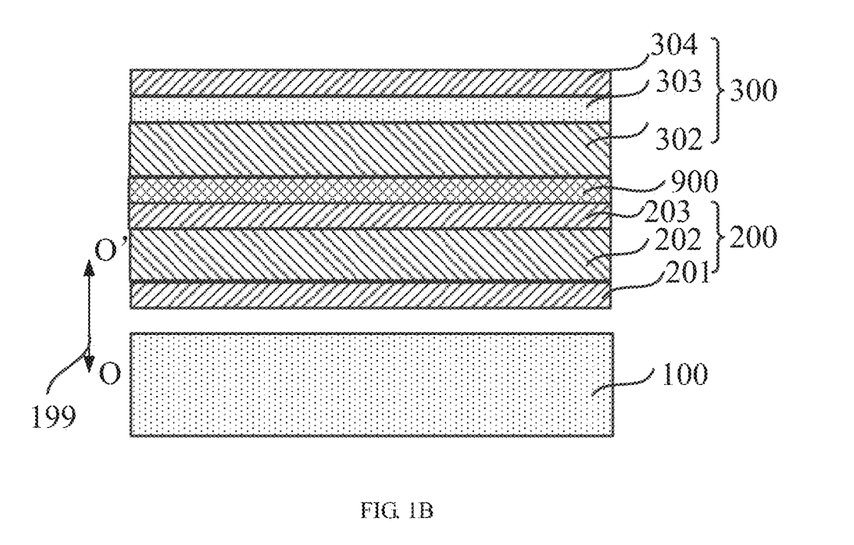
FIG. 1B is an exploded schematic view illustrating a dual-cell display device according to another example of the present application.
Figure 2:
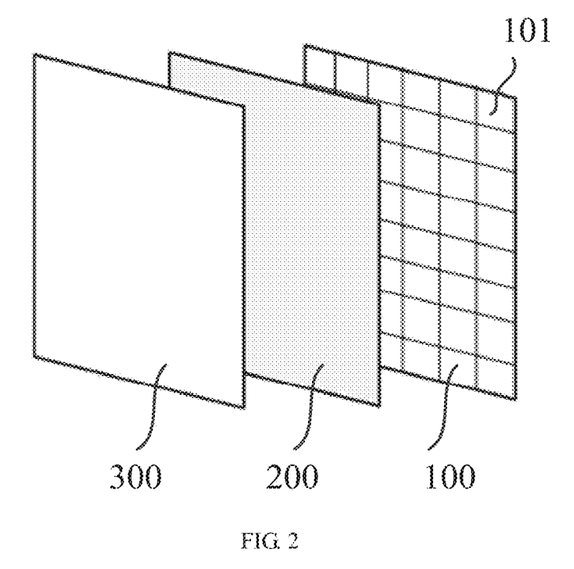
FIG. 2 is a block diagram illustrating a principle of a dual-cell display device according to an example of the present application.

FIGS. 1A and B are exploded schematic views illustrating a dual-cell display device according to an example of the present application. FIG. 2 is a block diagram illustrating an operation principle of a dual-cell display device according to an example of the present application.

Referring to FIGS. 1A, 1B and 2, the dual-cell display device includes a backlight module 100, a first panel 200, a second panel 300, and an adhesive layer 900 which are stacked in order. The backlight module 100 is configured to provide a light source. The first panel 200 is a panel for light control, which is used to control light flux from the backlight module 100 into the second panel 300. The second panel 300 is a color panel for displaying an image. The adhesive layer 900 is used to fix the first panel 200 and the second panel 300 together to form an integrated panel.

Referring to FIGS. 1A and 1B, along an O-O' direction 199 of the dual-cell display device, the first panel 200 includes a first polarizer 201 adjacent to the backlight module 100, a first liquid crystal light valve layer 202, and a second polarizer 203 in order. Polarization direction (or the transmittance axis) of the first polarizer 201 and polarization direction of the second polarizer 203 are perpendicular to each other. The light from the backlight module 100 is converted into first polarized light after passing through the first polarizer 201. Then, the first polarized light enters the first liquid crystal light valve layer 202. In this case, according to the contents of the displayed image, the direction of the first polarized light is rotated by controlling the rotation of liquid crystal in the first liquid crystal light valve layer 202 through voltage. Then, the first polarized light with a rotated angle enters the second polarizer 203 and is converted into second polarized light. Since the polarization direction of the first polarizer 201 and the polarization direction of the second polarizer 203 are perpendicular to each other, the control of the light flux entering the second panel 300 is realized. It is noted that the first panel 200 does not include a light filter. If the light from the backlight module 100 is white light, the first panel 200 is a black-and-white panel.

Referring to FIG. 1A, along the O-O' direction 199 of the dual-cell display device, the second panel 300 includes a third polarizer 301 adjacent to the first panel 200, a second liquid crystal light valve layer 302, a light filter 303 and a fourth polarizer 304 in order. Polarization direction of the third polarizer 301 and polarization direction of the fourth polarizer 304 are perpendicular to each other. The polarization direction of the second polarizer 203 and the polarization direction of the third polarizer 301 are parallel to each other. When the second polarized light from the first panel 200 enters the third polarizer 301, the polarization direction of the second polarized light does not rotate and then the second polarized light enters the second liquid crystal light valve layer 302. According to the contents of the displayed image, the polarization direction of the second polarized light is rotated by controlling the rotation of liquid crystal in the second liquid crystal light valve layer 302 through voltage. The second polarized light with a rotated angle enters the filter 203 and is converted into colored light. Then, the colored light enters the fourth polarizer 304 and is converted into third polarized light. Since the polarization direction of the third polarizer 301 and the polarization direction of the fourth polarizer 304 are perpendicular to each other, the control of the light flux of the colored light is realized, thereby realizing color display of an image.

If external water vapor enters between the first panel and the second panel, the water vapor will solidify into water drops between the first panel and the second panel due to temperature changes, thereby affecting the display quality. The adhesive layer 900 bonds the first panel 200 and the second panel 300 together in a surface attaching manner. The surface attaching refers to full attaching, that is, an adhesive layer is coated on the whole surface. To avoid light loss, the adhesive layer 900 may be a transparent adhesive layer, such as an Optically Clear Adhesive (OCA) or an Optically Clear Resin (OCR). To ensure a sufficiently strong bonding and avoid making the dual-cell thicker, the thickness of the adhesive layer may be between 0.15 mm and 0.75 mm. In some embodiments, the thickness of the adhesive layer may be between 0.25 mm and 0.5 mm.

It is to be noted that the first panel 200 includes a polarizer, for example, the second polarizer 203, and the second panel 300 includes a polarizer, for example, the third polarizer 301. FIG. 1A illustrates a case where the first panel 200 and the second panel 300 each have two polarizers. In other embodiments of the present disclosure, the first panel 200 and the second panel 30 may share a polarizer. FIG. 1B illustrates a case that the first panel 200 and the second panel 300 share one polarizer. In a case that a display quality is not significantly affected, saving one polarizer may reduce cost of the display apparatus. As shown in FIG. 1B, a difference from FIG. 1A is that the dual-cell display device does not include the third polarizer 301. In this display apparatus, the polarization direction of the first polarizer 201 and the polarization direction of the second polarizer 203 are perpendicular to each other, and the polarization direction of the second polarizer 203 and the polarization direction of the fourth polarizer 304 are perpendicular to each other. Similar to a principle of an optical path of the dual-cell display device shown in FIG. 1A, the second polarized light from the first panel 200 directly enters the second liquid crystal light valve layer 302. According to the contents of the displayed image, the polarization direction of the second polarized light is rotated by controlling the rotation of liquid crystal in the second liquid crystal light valve layer 302 through voltage. The second polarized light with a rotated angle enters the filter 203 and is converted into colored light. Then, the colored light enters the fourth polarizer 304 and is converted into the third polarized light. Since the polarization direction of the second polarizer 203 and the polarization direction of the fourth polarizer 304 are perpendicular to each other, the control of the light flux of the colored light is realized, thereby realizing the color display of an image.

In the dual-cell display device shown in FIG. 1B, the position of the adhesive layer 900 is between the second polarizer 203 and the second liquid crystal light valve layer 302. The location of the adhesive layer 900 is not limited to the above position in the present application. The adhesive layer 900 may also place between the first liquid crystal light valve layer 202 and the second polarizer 203.

The first liquid crystal light valve layer 202 and the second liquid crystal light valve layer 302 may be similar in structure, including an upper substrate, a lower substrate and a liquid crystal box placed between the upper substrate and the lower substrate.

The liquid crystal light valve layers in the first panel 200 and the second panel 300 may both include a plurality of liquid crystal boxes. Similar to a principle of light control in the second panel 300 (the color panel), the first panel 200 takes a single pixel as an independent light valve to realize pixel-level light control. Compared with a display apparatus with only one panel, the dual-cell display device has two layers of pixel-level light control, thereby realizing a finer control. Since the first panel 200 realizes the pixel-level light control, compared with the single-cell display apparatus, a brightness of a dark frame is significantly reduced through cooperation of the first panel 200 and the second panel 300, so that a problem that the dark frame has a certain brightness due to residual transmission of the liquid crystal light valve layer in the single-cell display apparatus is solved, thereby significantly increasing a static contrast of a liquid crystal display apparatus.

Since the first panel 200 realizes light control through the polarizer and the rotation of liquid crystal, and the transmittance of the polarizer is 38%-48%, the entire transmittance of the display apparatus may be reduced. In the present disclosure, a resolution of the first panel 200 may be less than a resolution of the second panel 300, that is, the number of pixels in the first panel 200 may be set to be less than the number of pixels in the second panel 300, to avoid an insufficient display brightness of the display apparatus, resulting from a reduced transmittance of the light from the backlight module through the first panel 200 due to using the dual-cell. A ratio of the number of pixels in the second panel 300 and the number of pixels in the first panel 200 may be not less than 4:1, for example, 4:1 and 16:1. That is, when the resolution of the second panel 300 is 8K, the resolution of the first panel 200 is 4K or 2K; when the resolution of the second panel 300 is 4K, the resolution of the first panel 200 is 2K.

Specifically, in some embodiments of the present disclosure, the resolution of the first panel 200 is 1920*1080, and the resolution of the second panel 300 is 3840*2160.

In some embodiments of the present disclosure, as shown in FIG. 2, to further increase the image contrast, the backlight module 100 adopts multiple controllable backlight partitions. That is, a backlight source in the backlight module 100 is divided into a plurality of backlight partitions 101, and the brightness of each backlight partition 101 is dynamically changed according to brightness information contained in the displayed image information. A bright area in the image corresponds to a high backlight brightness, and a dark area in the image corresponds to a low backlight brightness. Compared with constant backlight provided by a backlight module without partition, problems that a dark frame still has weak light leakage and power consumption is large (because the backlight needs to be fully on) are solved by dynamically adjusting the backlight brightness at the partition level, thereby further increasing a brightness contrast of the image shown in the dual-cell display device and improving the image quality.

Figure 3:
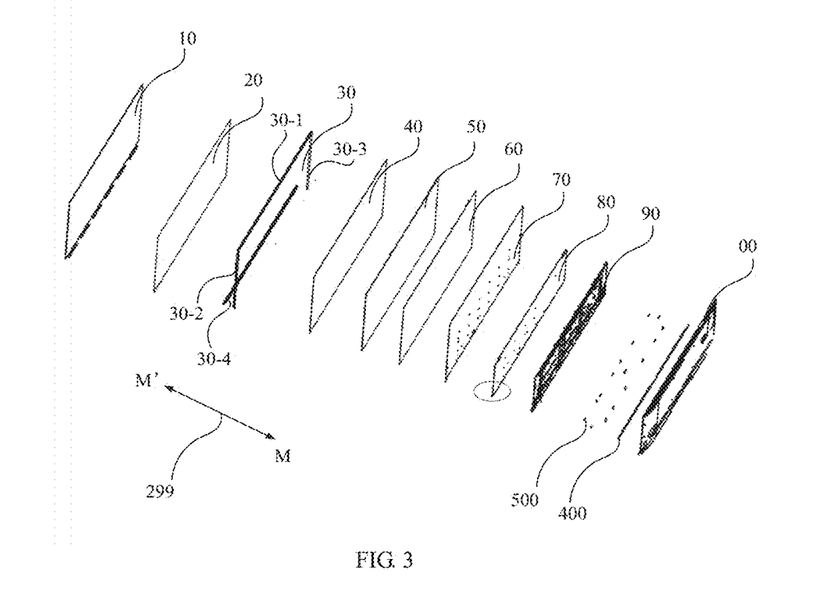
FIG. 3 is an exploded schematic view illustrating a dual-cell display device according to an example of the present application.
Figure 4:
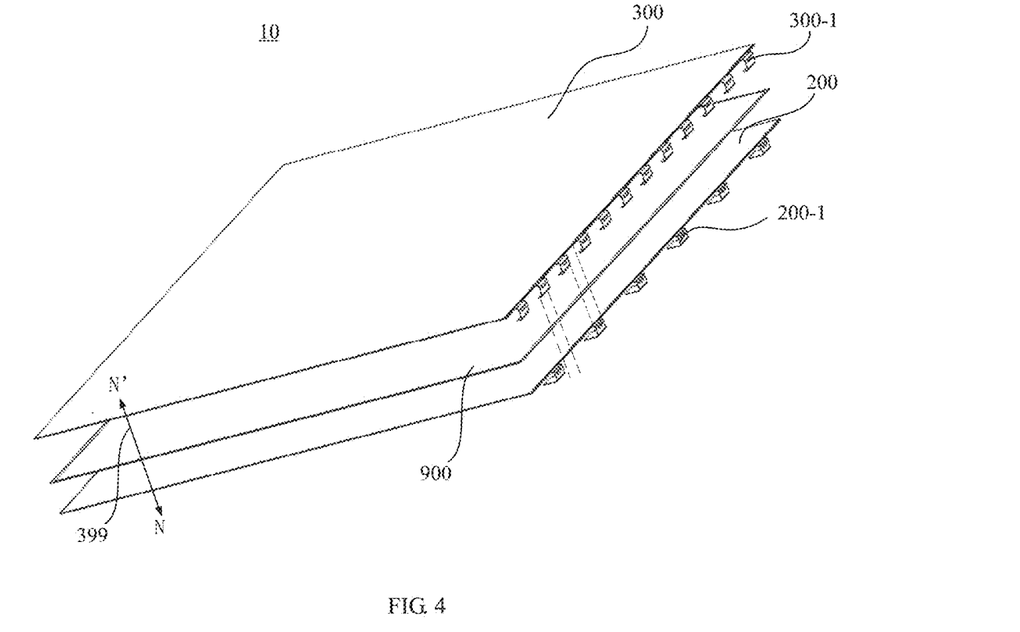
FIG. 4 is an exploded schematic view illustrating a dual-cell according to an example of the present application.
Figure 5:
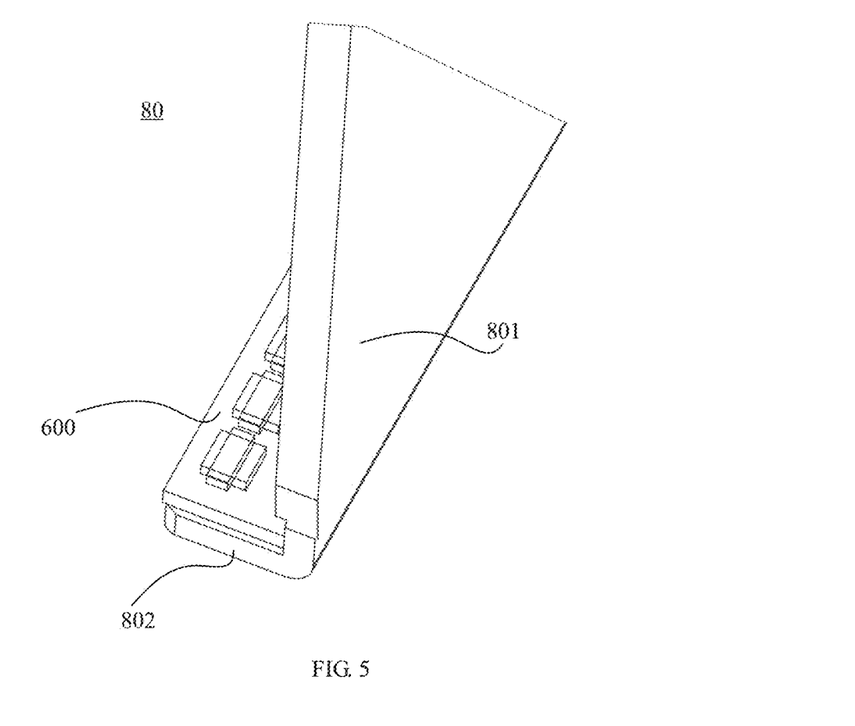
FIG. 5 is an enlarged schematic view illustrating a circled portion in FIG. 3 according to an example of the present application.
Figure 6:
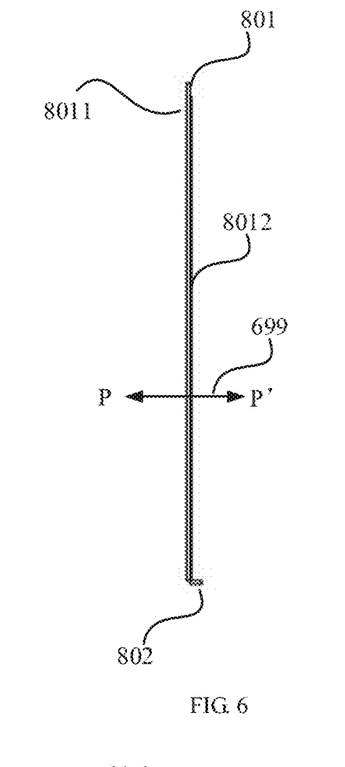
FIG. 6 is a side view illustrating a heat tube according to an example of the present application.
Figure 7:
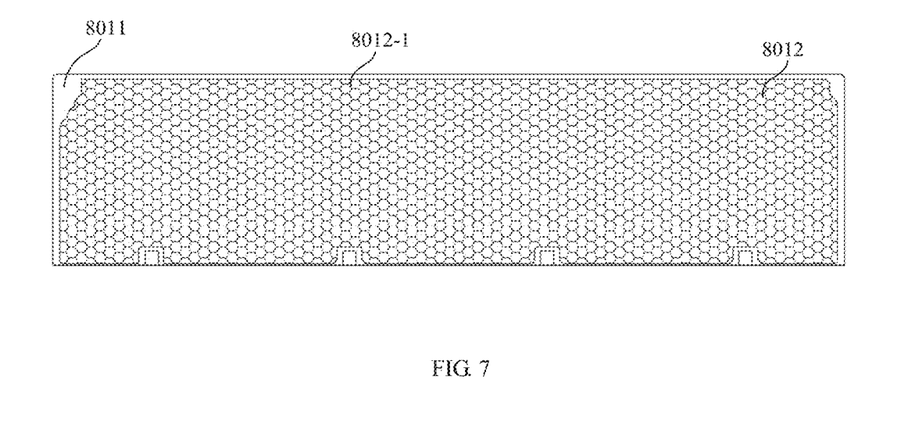
FIG. 7 is a front view illustrating a body portion of the heat tube according to an example of the present application.

FIG. 3 is an exploded schematic view illustrating a dual-cell display device. FIG. 4 is an exploded schematic view illustrating a dual-cell 10 of FIG. 3. FIG. 5 is an enlarged schematic view illustrating a circled portion in FIG. 3. FIG. 6 is a side view illustrating a heat tube 80 of FIG. 3. FIG. 7 is a front view illustrating a body portion of the heat tube 80 of FIG. 3.

Referring to FIG. 3, along an M-M' direction 299 of the dual-cell display device, the dual-cell display device includes a rear housing 00, a first backplane 90, the heat tube 80, a second backplane 70, a reflector 60, a light guide plate 50, an optical sheet set 40, a middle frame 30, a panel adhesive tape 20, the dual-cell 10 in order.

In addition, the dual-cell display device further includes a drive board 400 and a holder assembly 500 between the rear housing 00 and the first backplane 90.

Referring to FIG. 4, along the N-N' direction 399 of the dual-cell display device, the dual-cell 10 includes a first panel 200, a second panel 3), and an adhesive layer 900 in order. The first panel 200 includes at least one first flexible circuit board 200-1 on a side of the first panel 200. The second panel 300 includes at least one second flexible circuit board 300-1 on a side of the second panel 300, where the side of the first panel 200 where the at least one first flexible circuit board 200-1 are located and the side of the second panel 300 where the at least one second flexible circuit board 300-1 are located is a same side. The at least one first flexible circuit board 200-1 and the at least one second flexible circuit board 300-1 are connected with the drive board 400 to drive and control the first panel 200 and the second panel 300. It is assumed that N' direction is upward and N direction is downward, in this case, as shown in FIG. 4, the side of the first panel 200 where the first flexible circuit boards 200-1 are located is the lower side of the first panel 200; and the side of the second panel 300 where the second flexible circuit boards 300-1 are located is the lower side of the second panel 300.

As shown in FIG. 4, the number of the first flexible circuit boards 200-1 on the first panel 200 is less than the number of the second flexible circuit boards 300-1 on the second panel 300. This is mainly because the resolution of the first panel 200 is less than the resolution of the second panel 300.

Further, as shown by dashed lines in FIG. 4, the at least one second flexible circuit board 300-1 and the at least one first flexible circuit board 200-1 are misaligned, that is, the at least one second flexible circuit board 300-1 and the at least one first flexible circuit board 200-1 do not overlap, so as to facilitate the connection of both the at least one first flexible circuit board and the at least one second flexible circuit board to the drive board 400, and to avoid interference between the two sets of flexible circuits and reduce circuit damage. In other words, if the first flexible circuit boards 200-1 are projected onto the second panel 300 along the N'-N direction 399, the projection of each first flexible circuit board 200-1 onto the second panel 300 does not overlap with the second flexible circuit boards 300-1.

The panel adhesive tape 20 is located between the dual-cell 10 and the middle frame 30 for adhesively fixing the dual-cell 10 with the middle frame 30, thereby fixing the dual-cell 10.

It is different from adhering a single-cell panel with a single side or double sides on the middle frame, since the dual-cell 10 in the dual-cell display device includes two panels, the dual-cell 10 is heavier than a conventional liquid crystal display device (single-cell panel). In order to fix the dual-cell 10 tightly, in the present application, the dual-cell 10 is adhered with the middle frame 30 with four edges, that is, the dual-cell 10 is fixed in a four-edge adhesion manner.

Referring to FIG. 3, the middle frame 30 includes atop frame 30-1, a left frame 30-2, a right frame 30-3, and a bottom frame 30-4. Structures of the top frame 30-1, the left frame 30-2, and the right frame 30-3 are similar, and the three frames may be of an integrated structure, or be assembled by splicing their ends. A structure of the bottom frame 30-4 will be described in detail below.

The optical sheet set 40, which typically includes one or more sheets, is configured to condense light and improve brightness.

The light guide plate 50 is configured to allow light incident from a side edge of the light guide plate 50 to exit from a front surface of the light guide plate 50. The light guide plate 50 is provided with a plurality of light exit dots (not shown). The material of the light guide plate 50 may include PMMA (polymethyl methacrylate) or glass.

The reflector 60 is configured to reflect light from a light source 600 shown in FIG. 5 into the M-M' direction 299. The reflector 60 may be adhesively fixed with the light guide plate 50.

The heat tube 80 is located between the first backplane 90 and the second backplane 70. The first backplane 90 is closer to the rear housing 00 than the second backplane 70.

In the present application, an area of the first backplane 90 may be less than an area of the second backplane 70. The area of the first backplane 90 may be ½ to ⅕ of the area of the second backplane 70. In the embodiments of the present application, the first backplane 90 may include, for example, a steel plate or an aluminum plate. The first backplane 90 is stamped with a plurality of convex hulls for mounting and fixing power supply boards, speakers and other components and parts (not shown).

The second backplane 70 has a flat plate shape as a whole. In the embodiments of the present application, the second backplane 70 may be a composite plate. Along a thickness direction of the second backplane 70, the second backplane 70 includes a first layer, a third layer, and a second layer between the first layer and the third layer. The first layer and the third layer may be made of a same material, for example, a steel plate or an aluminum plate. The second layer may be a PE layer. Because the second backplane 70 includes three layers of materials, a strength of the second backplane 70 is higher than a strength of a single-layer steel plate or a single-layer aluminum plate. Thus, the thickness of the second backplane 70 may be smaller for satisfying a predetermined strength requirement compared with a single layer backplane.

As shown in FIG. 5, the heat tube 80 includes a body portion 801, and a bent portion 802 connected with the body portion 801 at an angle. In the embodiments of the present application, the bent portion 802 and the body portion 801 may form a 90° angle. The heat tube 80 has an L shape. The light source 600 is a single light bar fixed on the bent portion 802. Light from the light source 600 enters into the light guide plate 50 from a side edge of light guide plate 50. The dual-cell display device may be an edge lit type display device in this configuration.

Further, the body portion 801 of the heat tube 80 is located between the second backplane 70 and the first backplane 90, and an area of the body portion 801 is less than an area of the second backplane 70, and an area of the body portion 801 is less than an area of the first backplane 90. That is, the heat tube 80 covers a part of the first backplane 90 and a part of the second backplane 70 for cooling the light source 600.

Referring to FIGS. 6-7, along a P-P' direction 699 of the body portion 801 of the heat tube 80, the body portion 801 of the heat tube 80 includes a flat plate portion 8011 and a conduit portion 8012. The conduit portion 8012 protrudes toward a side with respect to the flat plate portion 8011. Referring to FIG. 7, the conduit portion 8012 includes a plurality of conduits 8012-1, and the plurality of conduits 8012-1 are connected to each other to form a exemplary hexagonal honeycomb structure. The conduits 8012-1 are filled with a phase changing material (which changes phases between, e.g., gaseous phase and liquid phase as a function temperature). Blank portions (unoccupied by the conduits) in the hexagonal honeycomb structure may be used to open a mounting hole or the like for mounting other components.

According to the above analysis, since the dual-cell reduces the overall light transmittance of the display device, in order to ensure the brightness of the display device, the light source 600 used in the dual-cell display device may have a relatively large power, so that more heat is generated therefrom accordingly. Conventional L-shaped aluminum material may not meet the heat dissipation requirement. However, because the heat tube 80 in the embodiments of the present application is configures with conduits filled with the phase changing material, when the light source 600 mounted on the bent portion 802 of the heat tube 80 generates heat, the phase changing material in the conduits near the bent portion 802 first absorbs the heat to change phase, and then the phase changing material passes through the plurality of conduits 8012-1 to move away from the bent portion 802, so as to carry away the heat generated by the light source 600. Moreover, in the embodiments of the present application, the honeycomb shape of the conduits 8012-1 increases the heat dissipation area, which improves the heat transfer, and facilitates uniform heat dissipation.

The heat tube 80 in the present application may be made of an aluminum material with good heat conductivity for heat dissipation, and may be formed by pressing two aluminum plates at a certain temperature. Specifically, a conduit pattern is first designed on a surface of one aluminum plate, and a pressing material is sprayed on the surface of the aluminum plate, then the other aluminum plate is covered thereon to be pressed into one piece at a certain temperature by a pressing device to form a pressed plate. Thereafter, the pressed plate is inflated through high-pressure inflation to form a designed heat tube conduit shape. After a small amount of liquid with a certain pressure is filled into the conduits from an injection port, the injection port is sealed, and then a bending operation is performed to obtain the "L" shaped heat tube.

In the present application, a thickness of the heat tube 80 is between 1.0 and 3 mm. Moreover, in the present application, the heat tube 80 has a conduit portion 8012 on a single side. For example, the conduit portion 8012 faces toward the second backplane 70, and the second backplane 70 has a relatively large area, which is advantageous for heat dissipation. It should be noted that the heat tube 80 may also be placed reversely, that is, the conduit portion 8012 faces toward the first backplane 90. Compared to facing toward the second backplane 70, facing toward the first backplane 90 enables the heat tube 80 to be closer to the outside, which is favorable to dissipate heat to the outside.

Returning to FIG. 4, the dual-cell 10 in the dual-cell display device includes the first panel 200 and the second panel 300. The first panel 200 includes at least one first flexible circuit board 200-1 on a side of the first panel 200. The second panel 300 also includes at least one second flexible circuit board 300-1 on a side of the second panel 300. The side of the first panel 200 where the at least one first flexible circuit board 200-1 are located and the side of the second panel 300 where the at least one second flexible circuit board 300-1 are located may be a same side. The at least one first flexible circuit board 200-1 of the first panel 200 are connected with the drive board 400, the at least one second flexible circuit board 300-1 of the second panel 300 are connected with the drive board 400, which are different from the case of a single-cell panel. The connection between the dual-cell 10 and the drive board 400 will be described below.

Figure 8:
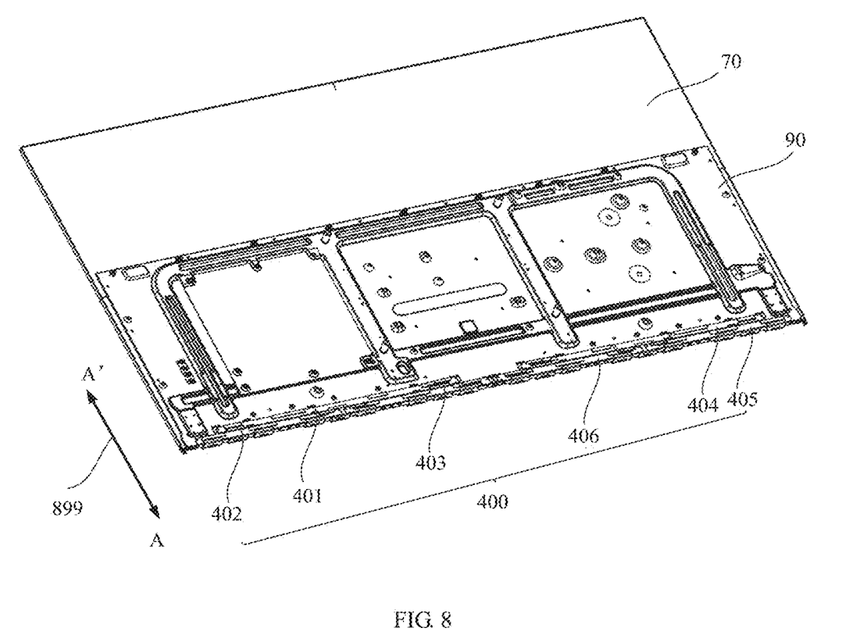
FIG. 8 is a schematic structural view illustrating a dual-cell display device after a rear housing is removed according to an example of the present application.
Figure 9:
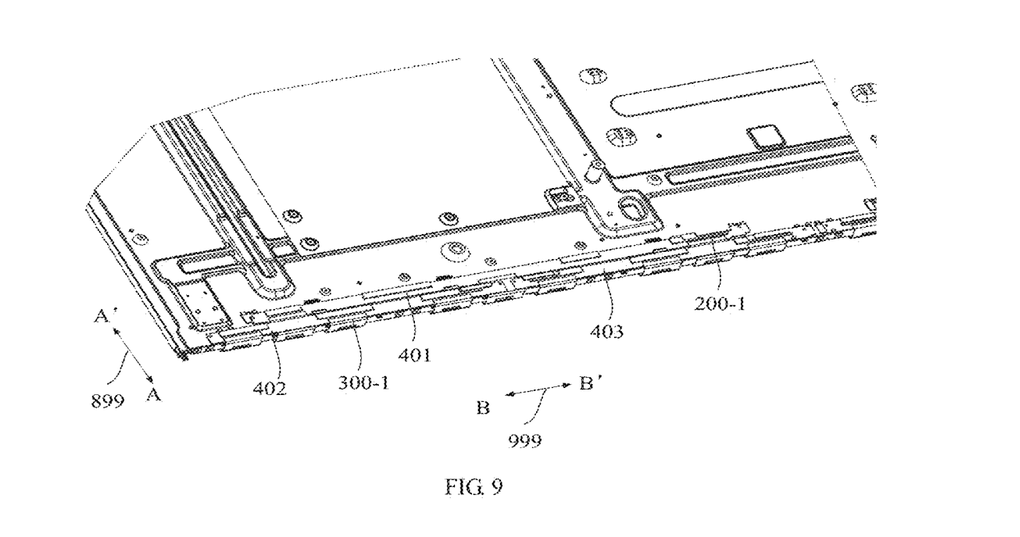
FIG. 9 is an enlarged view illustrating a portion of structure in FIG. 8 according to an example of the present application.
Figure 10:
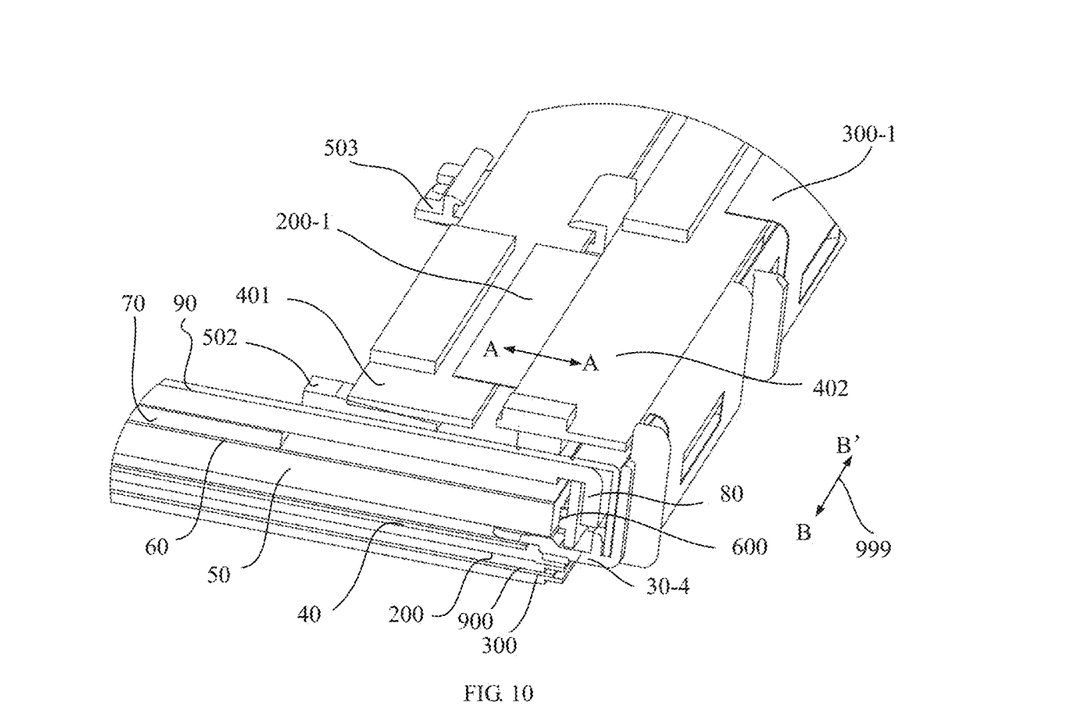
FIG. 10 is a cross-sectional view illustrating the structure shown in FIG. 9 at a second holder according to an example of the present application.
Figure 11:
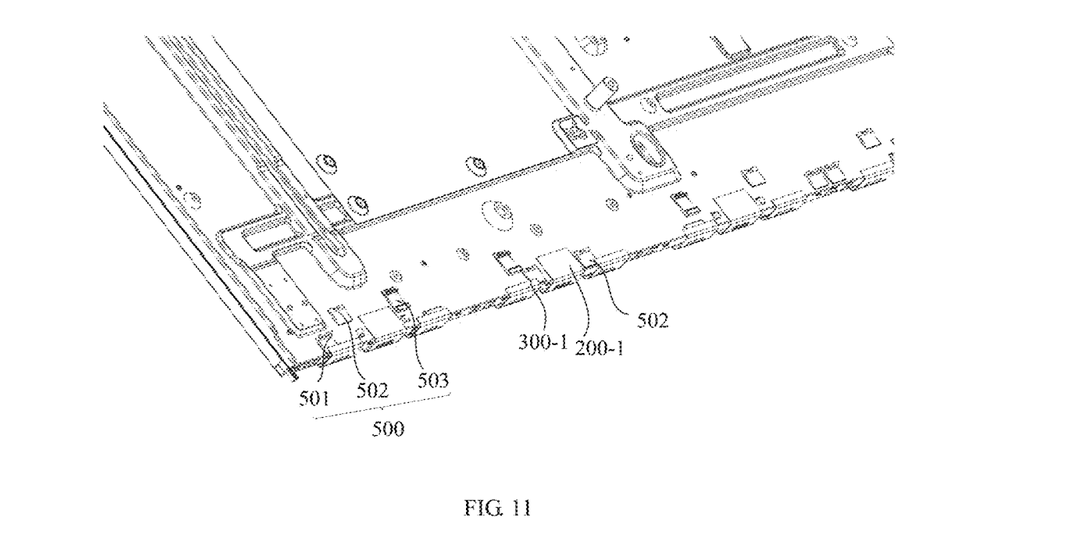
FIG. 11 is a schematic structural view illustrating the structure shown in FIG. 9 after a drive board is removed according to an example of the present application.
Figure 12:
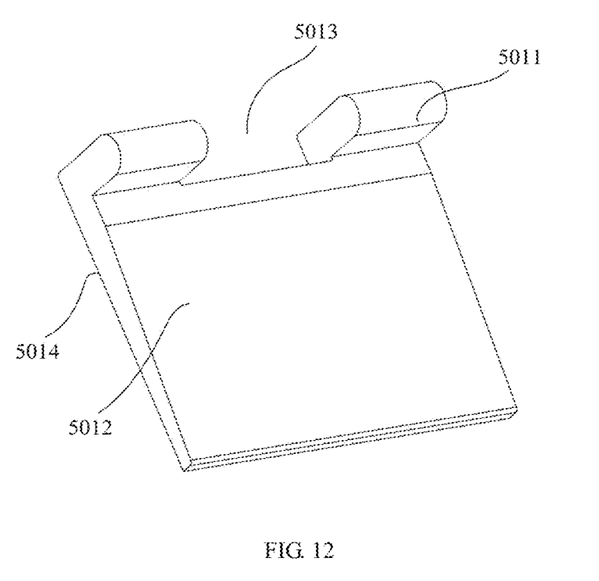
FIG. 12 is a schematic structural view illustrating a first holder according to an example of the present application.
Figure 13:
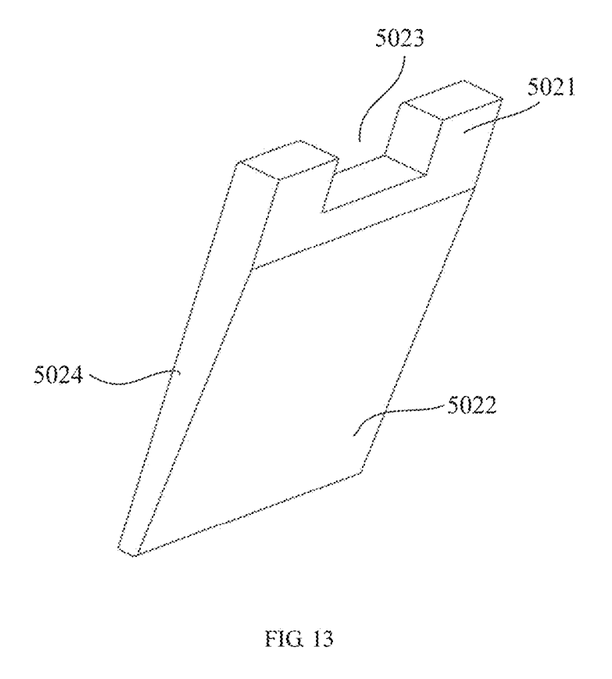
FIG. 13 is a schematic structural view illustrating a second holder according to an example of the present application.
Figure 14:
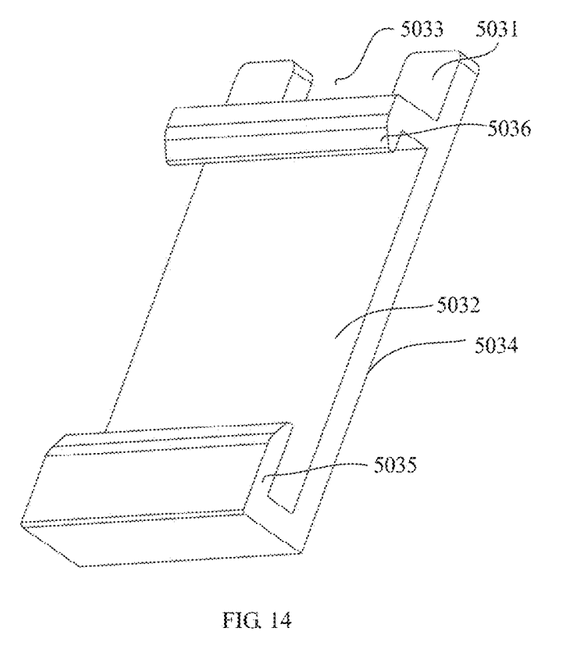
FIG. 14 is a schematic structural view illustrating a third holder according to an example of the present application.
Figure 15:
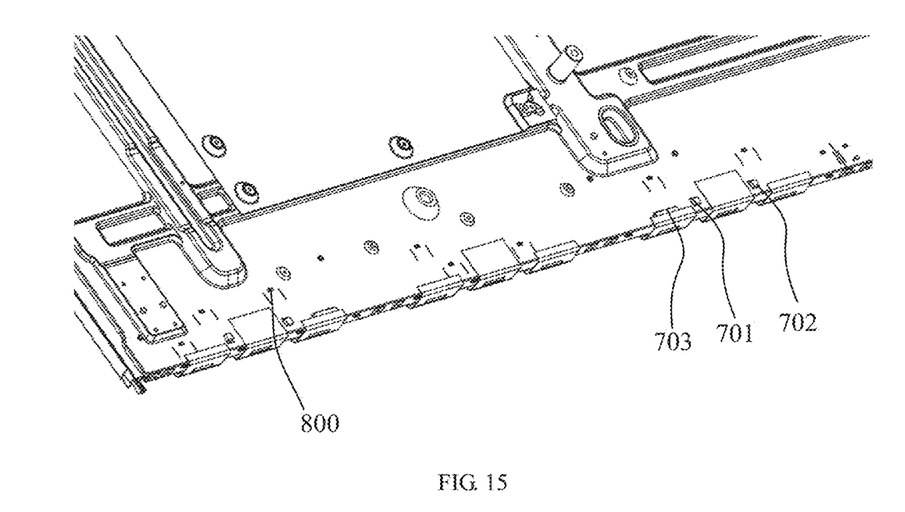
FIG. 15 is a schematic structural view illustrating the structure shown in FIG. 9 after holders are removed according to an example of the present application.

FIG. 8 is a schematic structural view illustrating a dual-cell display device after a rear housing 00 is removed according to an example of the present application. FIG. 9 is an enlarged view illustrating a portion of structure in FIG. 8. FIG. 10 is a cross-sectional view illustrating the structure shown in FIG. 9 at a second holder 502. FIG. 11 is a schematic structural view illustrating the structure shown in FIG. 9 after the drive board 400 is removed. FIG. 12 is a schematic structural view illustrating a first holder 501. FIG. 13 is a schematic structural view illustrating the second holder 502. FIG. 14 is a schematic structural view illustrating a third holder 503. FIG. 15 is a schematic structural view illustrating the structure shown in FIG. 9 after the holder is removed.

Referring to FIGS. 8 and 9, the drive board 400 in the dual-cell display device includes two portions that are symmetric along a symmetric axis, where the symmetric axis is parallel with a width direction (A-A' direction 899) of the dual-cell display device. The first portion includes a first drive board 401, a second drive board 402, and a third drive board 403. The second portion includes a fourth drive board 404, a fifth drive board 405, and a sixth drive board 406. The position and function of the first drive board 401 are equivalent to those of the fourth drive board 404. The position and function of the second drive board 402 are equivalent to those of the fifth drive board 405. The position and function of the third drive board 403 are equivalent to those of the sixth drive board 406. The drive board 401, the second drive board 402, and the third drive board 403 will be described below as an example.

In the embodiments of the present application, the second drive board 402 and the third drive board 403 are arranged side by side in a B-B' direction 999 of the dual-cell display device. The second drive board 402 and the third drive board 403 are connected end to end. The first drive board 401 is arranged parallel to the second drive board 402 in the A-A direction 899, and a distance between the first drive board 401 and the bottom frame 30-4 in the A-A' direction 899 is greater than a distance between the second drive board 402 and the bottom frame 30-4 in the A-A' direction 899. The second drive board 402 and the third drive board 403 are closer to an edge of the dual-cell display device than the first drive board 401.

As shown in FIGS. 9 and 10, the first flexible circuit boards 200-1 on the first panel 200 are connected with the first drive board 401. The second flexible circuit boards 300-1 on the second panel 300 are connected with the second drive board 402. Since the first flexible circuit boards 200-1 need to pass through the second drive board 402 in an A-A' direction 899 shown in FIG. 10, in order to avoid breakage due to the friction of the second drive board 402 against the first flexible circuit board 200-1, and to avoid loose connection between the first flexible circuit boards 200-1 and the first drive board 401 due to the thickness of the second drive board 402, in the embodiments of the present application, a distance difference between a distance from the first drive board 401 to the first backplane 90 and a distance from the second drive board 402 to the first backplane 90 is set by arranging holder assembly 500, where the distance difference may be between 0.5 and 2 mm. In some embodiments, a distance between the first drive board 401 and the first backplane 90 may be less than a distance between the second drive board 402 and the first backplane 90. The first flexible circuit boards 200-1, after passing through a gap between the second drive board 402 and the first backplane 90, are connected and fixed with the first drive board 401.

As shown in FIG. 11, in the embodiments of the present application, the holder assembly 500 includes three types of holders: a first holder 501, a second holder 502, and a third holder 503.

Referring to FIGS. 9 and 11, holders for supporting the first drive board 401 includes two types: the second holder 502 and the third holder 503. The second holders 502 are arranged on two ends of the first drive board 401. The third holders 503 are arranged at middle portion of the first drive board 401. The number of the second holders 502 and the third holders 503 may be reasonably selected according to a length of the first drive board 401. In the embodiments of the present application, two second holders 502 and three third holders 503 may be used to support the first drive board 401. A distance between the holders may be set accordingly. Holders for supporting the second drive board 402 includes two types: the first holder 501 and the second holder 502. The first holder 501 is arranged on one end of the second drive board 402, and the second holder 502 is arranged on the other end of the second drive board 402. In the embodiments of the present application, one first holder 501 and one second holder 502 may be configured to support the second drive board 402.

In addition to the first holder 501 and the second holder 502 for supporting the second drive board 402, with reference to FIG. 15, support blocks 701 and 702 and a backplane protrusion 703 on a side of the support block 701 or 702 may be disposed on the opposite sides of the first flexible circuit boards 200-1. The support blocks 701, 702 and the backplane protrusion 703 support the second drive board 402. The support blocks 701, 702 and the backplane protrusion 703 allows a sufficient gap between the second drive board 402 and the first backplane 90, so as to avoid the friction of the second drive board 402 against the first flexible circuit boards 200-1 by preventing a collapse of the middle portion of the second drive board 402. As such, the first flexible circuit boards 200-1 may smoothly pass through the gap between the second drive board 402 and the first backplane 90, and then fixedly connected with the first drive board 401. The support blocks 701, 702 may be made of, for example, a foam material.

Referring to FIG. 12, the first holder 501 includes a first stop portion 5011, a first support portion 5012 connected with the first stop portion 5011, a first fitting portion 5014 opposite to the first support portion 5012, and a first notch 5013 located in the first stop portion 5011. The first support portion 5012 is configured to support the second drive board 402. The first fitting portion 5014 is configured to adhere onto the first backplane 90. The first stop portion 5011 is located at an end of the first holder 501 away from the bottom frame 30-4 for restricting the drive board 402 from moving toward a direction near the first stop portion 5011. In some embodiments, the first stop portion 5011 may have a flat wall structure, and a surface where the first stop portion 5011 is located is perpendicular to a surface where the first fitting portion 5014 is located.

In the embodiments of the present application, the first fitting portion 5014 may be a flat surface. The first support portion 5012 is an inclined surface as a whole. In some embodiments, the first support portion 5012 is inclined from a side close to the bottom frame 30-4 toward a direction close to the first stop portion 5011 to form the inclined surface, and an inclination angle between the first fitting portion 5014 and the first support portion 5012 may be within 30 degrees. Such arrangement facilitates the first holder 501 to fit on the first backplane 90. Moreover, the arrangement of the inclined surface facilitates the second drive board 402 to be placed on the first holder 501 from an end away from the first stop portion 5011.

Referring to FIG. 13, the second holder 502 includes a second joint portion 5021, a second support portion 5022 connected with the second joint portion 5021, a second fitting portion 5024 opposite to the second support portion 5022, and a second notch 5023 located in the second joint portion 5021. The second support portion 5022 is configured to support the drive board 400 (401 or 402). The second fitting portion 5024 is configured to adhere onto the first backplane 90. The second joint portion 5021 is located at an end of the second holder 502 away from the bottom frame 30-4 for fixing the second holder 502 on the first backplane 90.

In the embodiments of the present application, the second fitting portion 5024 is a flat surface. The second support portion 5022 is an inclined surface as a whole. In some embodiments, the second support portion 5022 is inclined from a side close to the bottom frame 30-4 toward a direction close to the second joint portion 5021 to form an inclined surface, and an inclination angle between the second fitting portion 5024 and the second support portion 5022 may be within 30 degrees. Such arrangement facilitates the second holder 502 to fit on the first backplane 90. Moreover, the arrangement of the inclined surface facilitates the drive board 400 to be placed on the second holder 502 from an end away from the second joint portion 5021.

As shown in FIG. 14, the third holder 503 includes a third joint portion 5031, a third support portion 5032 connected to the third joint portion 5031, a third fitting portion 5034 opposite to the third support portion 5032, and a third notch 5033 located in the third joint portion 5031. The third support portion 5032 is configured to support the first drive board 401. The third fitting portion 5034 is configured to adhere onto the first backplane 90. The third joint portion 5031 is located at an end of the third holder 503 away from the bottom frame 30-4 for fixing the third holder 503 on the first backplane 90.

In addition, the third holder 503 further includes a first hook portion 5035 and a second hook portion 5036. The first hook portion 5035 is located at one end of the third support portion 5032, and the second hook portion 5036 is located at the other end of the third support portion 5032. The second hook portion 5036 is located between the third joint portion 5031 and the third support portion 5032. The first hook portion 5035 is connected with an end of the third support portion 5032, and is formed by extending along a plane perpendicular to the third support portion 5032 and then bending toward the third support portion 5032. The second hook portion 5036 is arranged opposite to the first hook portion 5035. The first hook portion 5035, the second hook portion 5036 and the third support portion 5032 together form a C-shaped structure. When the first drive board 401 is placed on the third holder 503, two sides of the first drive board 401 may be restricted from moving along an A-A' direction 899, thereby fixing the first drive board 401.

Referring to FIG. 15, in the present application, the holder assembly 500 is fixed on the first backplane 90 by adhesion. Specifically, adhesive is disposed on a fitting portion of the holder. Moreover, on positions of the first backplane 90 corresponding to the holder assembly 500, positioning blocks (or pegs) 800 are correspondingly disposed. With reference to FIG. 11, the positioning blocks 800 are respectively located at the first notch 5013 in the first holder 501, the second notch 5023 in the second holder 502, and the third notch 5033 in the third holder 503. In this way, through the positioning blocks 800, the holder assembly 500 may be positioned and fixed to a preset position at a preset distance.

According to the structural design described above, when the dual-cell is used in the dual-cell display device, the connection and assembly between the flexible circuit boards and the drive board is realized.

Figure 16:
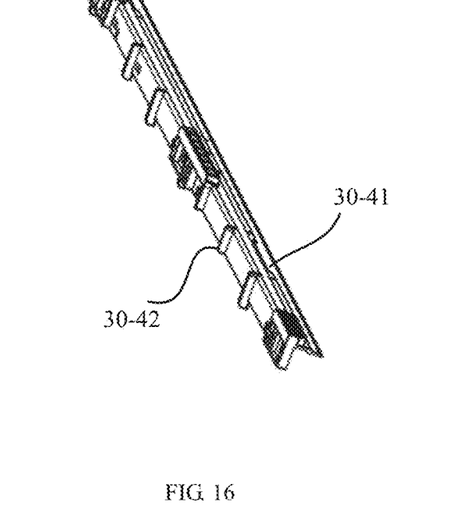
FIG. 16 is a schematic overall structural view illustrating a bottom frame 30-4 according to an example of the present application.
Figure 17:
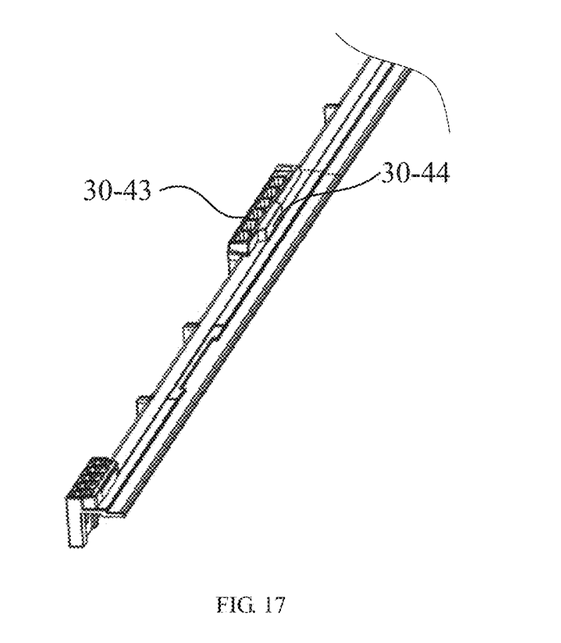
FIG. 17 is a schematic partial structural view illustrating a bottom frame 30-4 according to an example of the present application.

FIG. 16 is a schematic overall structural view illustrating the bottom frame 30-4. FIG. 17 is a schematic partial structural view illustrating the bottom frame 30-4.

Referring to FIGS. 16-17 and 10, the bottom frame 30-4 includes a panel support portion 30-41, a side wall portion substantially perpendicular to the panel support portion 30-41, and a plurality of protrusions 30-42 located in the side wall portion. The panel support portion 30-41 is configured to support the dual-cell 10. A receptacle region of the flexible circuit boards is formed between adjacent protrusions 30-42 for avoiding the flexible circuit boards from being damaged due to external force.

Referring back to FIG. 10, the dual-cell 10 includes a first panel 200, a second panel 300, and an adhesive layer 900. Since the dual-cell is heavy and includes two panels, the two panels may not be completely aligned so that there may be inevitable misalignment. In view of this, the bottom frame 30-4 in the present application further includes a limitation portion 30-43 on a side of the panel support portion 30-41, so as to avoid the dual-cell from sliding out of the bottom frame 30-4, thereby the dual-cell 10 is fixed more solidly and reliably. Considering the existence of the misalignment between the two panels, in order to avoid edge abrasion of the two panels and limit the positions of the two panels, a buffer member 30-44 is disposed at a side of the position limitation portion 30-43 close to the panel support portion 30-41. In the present application, the buffer member 30-44 may be a foam material.

It should be noted that multiple limitation portions 30-43 may be arranged on the bottom frame 30-4 separated by a certain space.

The foregoing description of the embodiments has been provided for purposes of illustration and description. It is not intended to be exhaustive or to limit the disclosure. Individual elements or features of a particular embodiment are generally not limited to these particular embodiments, but, where applicable, are interchangeable and can be used in a selected embodiments, even if not specifically shown or described. The same may also be varied in many ways. Such variations are not to be regarded as a departure from the disclosure, and all such modifications are intended to be included within the scope of the disclosure.

The invention claimed is:

1. A dual-cell display device, comprising:
a first backplane, a first panel and a second panel arranged in order along a thickness direction of the dual-cell display device;
the first panel comprising at least one first flexible circuit board on a side of the first panel; and
the second panel comprising at least one second flexible circuit board on a counterpart side of the second panel corresponding to the side of the first panel where the at least one first flexible circuit board is disposed;
a first drive board connected with the at least one first flexible circuit board; and
a second drive board connected with the at least one second flexible circuit board,
wherein:
the first drive board and the second drive board are arranged in parallel on the first backplane, and a distance between the first drive board and the first backplane is different from a distance between the second drive board and the first backplane,
the first drive board and the second drive board are arranged on the first backplane through a holder assembly;
the holder assembly comprises a first holder and a second holder;
the second drive board is arranged on the first backplane through the first holder and the second holder;
the first holder comprises:
a first stop portion,
a first support portion connected to the first stop portion,
a first fitting portion opposite to the first support portion, and
a first notch located in the first stop portion; and
the second holder comprises:
a second joint portion,
a second support portion connected to the second joint portion,
a second fitting portion opposite to the second support portion, and
a second notch located in the second joint portion.

2. The dual-cell display device according to claim 1, wherein
the second drive board is closer to an edge of the dual-cell display device than the first drive board;
the distance between the first drive board and the first backplane is less than the distance between the second drive board and the first backplane; and
the at least one first flexible circuit board passes through a gap between the second drive board and the first backplane and are is fixedly connected with the first drive board.

3. The dual-cell display device according to claim 1, wherein:
the holder assembly further comprises a third holder;
the first drive board is arranged on the first backplane through the second holder and the third holder; and
the third holder comprises:
a third joint portion,
a third support portion connected to the third joint portion,
a third fitting portion opposite to the third support portion,
a third notch located in the third joint portion,
a first hook portion located at one end of the third support portion, and
a second hook portion located at the other end of the third support portion.

4. The dual-cell display device according to claim 1, wherein
the first holder and the second holder are respectively disposed on two ends of the second drive board.

5. The dual-cell display device according to claim 3, wherein
the second holder is disposed on two ends of the first drive board; and
the third holder is disposed at a middle portion of the first drive board.

6. The dual-cell display device according to claim 1, wherein the first support portion and the second support portion comprise inclined surfaces.

7. The dual-cell display device according to claim 3, wherein the second support portion comprises an inclined surface.

8. The dual-cell display device according to claim 1, further comprising:
at least one support block configured to support the second drive board and arranged on opposite sides of the first flexible circuit board.

9. The dual-cell display device according to claim 1, further comprising:
a middle frame, wherein the first panel and the second panel are fixed on the middle frame in a four-edge adhesion manner.

10. The dual-cell display device according to claim 1, further comprising:
a second backplane, wherein a distance between the second backplane and the first panel is greater than a distance between the first backplane and the first panel;
a heat tube between the first backplane and the second backplane, comprising:
a body portion comprising a plurality of conduits having a phase changing material therein; and
a bent portion connected with the body portion at an angle; and
a light source fixed to the bent portion.

11. The dual-cell display device according to claim 10, wherein the body portion comprises:
a flat plate portion; and
a conduit portion protruding toward a side with respect to the flat plate portion and comprising:
a plurality of conduits connected with each other to form a honeycomb structure.

12. The dual-cell display device according to claim 1, further comprising:
a middle frame comprising: a bottom frame located on a same side as the at least one first flexible circuit board and comprising:
a panel support portion; and a position limitation portion located on a side of the panel support portion.

13. The dual-cell display device according to claim 12, further comprising:
a buffer member arranged on a side of the position limitation portion close to the panel support portion.

* * * * *